UNITED STATES PATENT OFFICE.

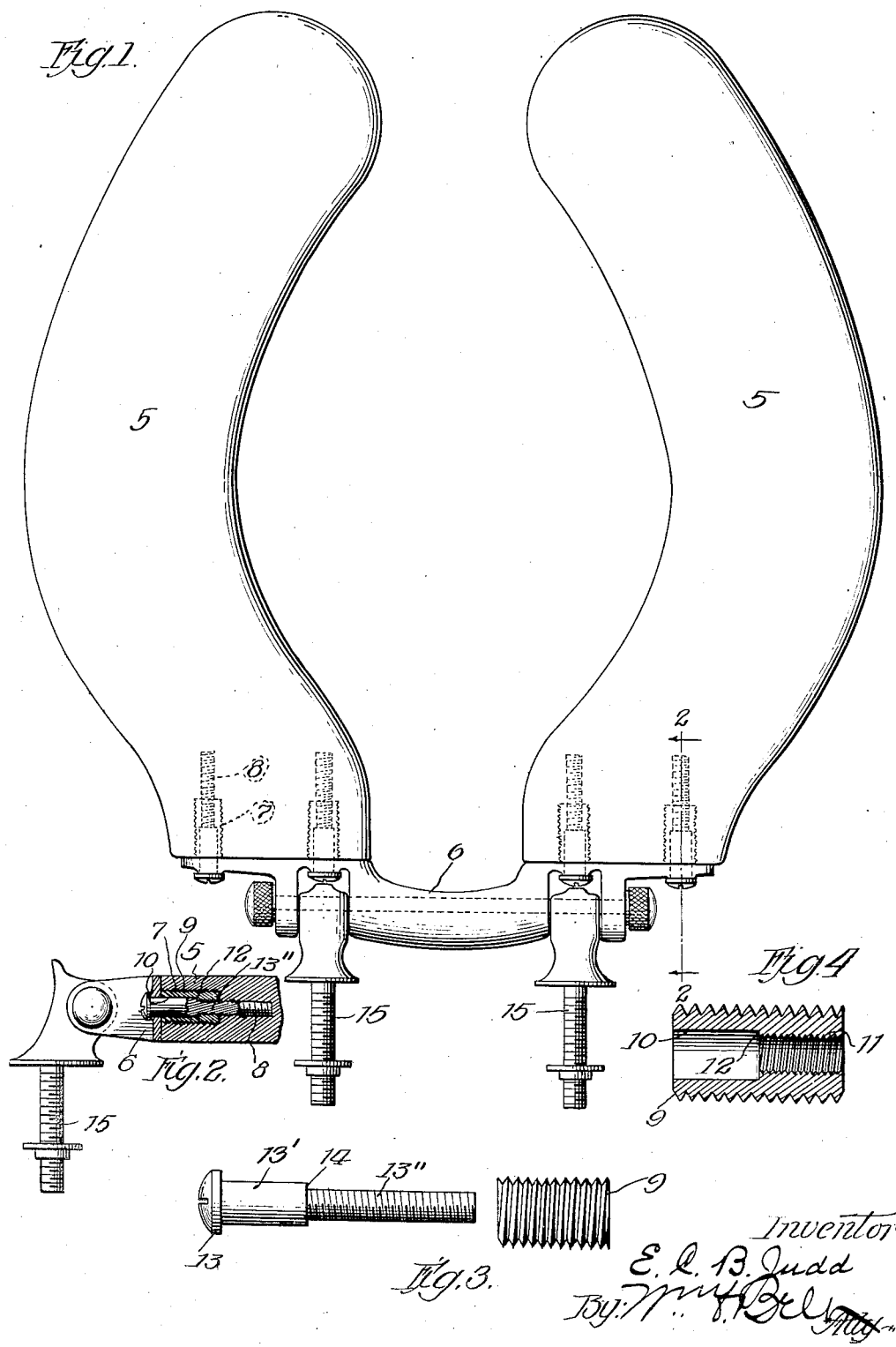

EARLDLEY C. B. JUDD, OF CHICAGO, ILLINOIS, ASSIGNOR TO THE BRUNSWICK-BALKE-COLLENDER COMPANY, OF CHICAGO, ILLINOIS, A CORPORATION OF DELAWARE.

CLOSET-SEAT HINGE.

1,332,557.      Specification of Letters Patent.      Patented Mar. 2, 1920.

Application filed October 31, 1919. Serial No. 334,762.

*To all whom it may concern:*

Be it known that I, EARLDLEY C. B. JUDD, a subject of the King of Great Britain, residing at Chicago, in the county of Cook and State of Illinois, have invented certain new and useful Improvements in Closet-Seat Hinges, of which the following is a specification.

This invention relates to hinges for connecting water closet seats to their bowls, and its object is to provide novel and improved means for securing the hinge to the seat in a strong and substantial manner so that the seat will not work loose in service.

The invention is especially adapted for use with seats made of solid composition but it can be used with seats made of wood or other cores covered with hard rubber, and with other seats.

In the accompanying drawings I have illustrated the invention in a modern type of seat to show a preferred embodiment, and referring thereto—

Figure 1 is a plan view of the seat with the hinge thereon;

Fig. 2 is a sectional view on the line 2—2 of Fig. 1;

Fig. 3 is a detail view of a bolt and its bushing.

Fig. 4 is a sectional view of the bushing.

Referring to the drawings the seat comprises the two wing members 5—5 which are connected rigidly by the hinge plate 6 which is secured to the seat members rigidly and substantially and by the novel means constituting the essential feature of this invention.

The seat members are provided with an enlarged bore 7 from which projects inwardly a small bore 8. A bushing 9 is seated in the larger bore 7. This bushing is threaded exteriorly and it may be forced into the bore, the threads biting into the wall of the bore, whereby the bushing is tightly secured in place. The bushing has a large smooth bore 10 at its outer end and a small threaded bore 11 at its inner end connecting with the bore 10, there being a shoulder 12 where the two bores join. A bolt 13 passes through the hinge member 6 and the bushing is seated in the seat. This bolt has a large smooth head portion 13' which fits snugly in the large bore 10 of the bushing, and a comparatively small end portion 13" which fits in the small bore 11 of the bushing and the small bore 8 in the seat. There is a peripheral shoulder 14 at the juncture of the large portion 13' and the small portion 13" of the bolt which abuts against the shoulder 12 in the bushing when the bolt is properly seated. The small portion 13" of the bolt is threaded to engage a corresponding thread in the wall of the small bore 11 of the bushing. The bolt may be screw threaded throughout the portion 13" so that the thread may bite into the wall of the small bore 8 just as the exterior thread on the bushing bites into the wall of the large bore 7, if desired, to secure a tight fit.

In the form of seat illustrated in the drawings provision is made for two bolts in each seat member to insure a rigid and secure connection of the seat members with the hinge. Bolts 15 of any suitable kind for connecting the seat with the bowl are pivotally engaged with the hinge plate 6 in any approved manner.

My present invention is especially designed for attaching the hinge to a solid composition seat so that the seat can be made without embodying any of the hinge parts and the hinge attached thereafter. In making the seat disclosed in the drawings the seat member 5 can be produced intact after which the bores 7 and 8 are made therein, the bushing inserted and the bolt screwed rigidly into place with the shoulder 14 abutting against the shoulder 12 to secure the hinge and the member together. As many bolts will be employed as may be found necessary or desirable for the purpose. The construction is strong and substantial and provides for a rigid connection of the seat and the hinge which will not work loose in actual use. This is a matter of the greatest importance in closet seats because it is a well known fact that they are often subjected to very rough usage and unless the hinge connection is strong and substantial and rigid it is very apt to work loose and result in damage to the seat. It is particularly important to provide this strong hinge connection in seats for public places where the usage is often especially rough and severe, and my invention is designed with this end in view. I am aware that changes in the form and proportion of parts and in the detail of construction may be made without departing from the spirit of the invention, and I therefore reserve the right to make all such changes as fairly fall within the scope of the appended claims.

I claim:

1. The combination of a water closet seat having bores therein, externally threaded bushings forced into said bores with the threads biting into the walls of the bores, a hinge member, and bolts passing through said hinge member and the bushings and seated in the seat beyond the bushings.

2. The combination of a water closet seat having a bore therein, an externally threaded bushing forced into said bore with the thread biting into the wall of the bore, an internal thread in said bushing, a hinge member, and a bolt passing through said hinge member and the bushing and threadedly engaging the bushing and the seat.

3. The combination of a water closet seat, a bushing seated therein and having a large bore at one end and a smaller connecting bore at the other end with a shoulder at the juncture of said bores, a hinge member, and a bolt passing through said hinge member and the bushing and threadedly engaging the seat beyond the bushing, said bolt having a shoulder to engage the shoulder in the bushing.

4. The combination of a water closet seat, a bushing seated therein and having a large bore at one end and a smaller connecting bore at the other end with a shoulder at the juncture of said bores, a hinge member, and a bolt passing through said hinge member and said bushing and seated in the seat beyond the bushing, said bolt having a large smooth portion to fit in the large bore of the bushing and having a smaller portion extending beyond said large portion to threadedly engage the small bore of the bushing and also the seat beyond the bushing.

5. The combination of a water closet seat, having a large bore therein with a smaller connecting bore extended therefrom, an externally threaded bushing forced into said large bore with the external thread biting into the wall of the bore, said bushing having a large smooth bore at one end thereof and a smaller threaded connecting bore at its other end with a shoulder at the juncture of said bores, a hinge member, and a bolt for securing the hinge member to the seat and having a large smooth head portion to fit snugly in the large bore of the bushing and a smaller threaded end portion to engage the threaded smaller bore of the bushing, said threaded end portion of the bolt projecting beyond the opening and into the seat with the thread biting into the wall of the small bore in the seat.

EARLDLEY C. B. JUDD.

Witnesses:
I. B. FUCHS,
W. H. OSBORN.